(12) United States Patent
Hashizume et al.

(10) Patent No.: US 7,483,726 B2
(45) Date of Patent: Jan. 27, 2009

(54) WIRELESS COMMUNICATION APPARATUS

(75) Inventors: Takanori Hashizume, Yokohama (JP);
Harunobu Seita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 338 days.

(21) Appl. No.: 11/215,022

(22) Filed: Aug. 30, 2005

(65) Prior Publication Data

US 2006/0046680 A1    Mar. 2, 2006

(30) Foreign Application Priority Data

Aug. 30, 2004 (JP) ............................ 2004-251038
Aug. 30, 2004 (JP) ............................ 2004-251039

(51) Int. Cl.
*H04M 1/00* (2006.01)
*H04Q 7/20* (2006.01)

(52) U.S. Cl. ................................ 455/575.3; 455/566

(58) Field of Classification Search ............. 455/575.3, 455/575.5, 575.7, 575.8, 566; 16/221, 330
See application file for complete search history.

(56) References Cited

U.S. PATENT DOCUMENTS 7,283,854 B2 * 10/2007 Sato et al. ................ 455/575.3

2006/0162122 A1 * 7/2006 Satoh et al. ................... 16/221

FOREIGN PATENT DOCUMENTS

| JP | 10-163748 | 6/1998 |
| JP | 11-312912 | 11/1999 |
| JP | 2002-261894 | 9/2002 |
| JP | 2003-101623 | 4/2003 |

* cited by examiner

*Primary Examiner*—Lee Nguyen
(74) *Attorney, Agent, or Firm*—Hogan & Hartson LLP

(57) ABSTRACT

An wireless communication apparatus having a first case and a second case connected on each end to be able to open and close. The first case has an antenna element in an end opposite to the connected end, the second case has a first display unit displaying an image on a facing surface facing the first case in a closed state, a first drive unit driving the first display unit, a second display unit displaying an image on a back surface which is behind the facing surface, a second drive unit driving the second display unit, a frame which is provided between the first display unit and the second display unit and touched a back of the first display unit. The frame, the first drive unit and the second drive unit are arranged without overlapping the antenna element in the closed state, the second display unit is layered on the frame to overlap the second display unit and the antenna element in the closed state.

14 Claims, 11 Drawing Sheets

WIRELESS COMMUNICATION APPARATUS

BACKGROUND OF THE INVENTION

1. Field of the Invention

The present invention relates to a wireless communication apparatus, such as a cellular phone, etc.

2. Description of the Related Art

In a wireless communication apparatus such as a portable terminal, the miniaturization is demanded for the improvement of a portability and a reduction of an arrangement area. On the other hand, it is demanded to reduce a noise to the wireless communication apparatus. However, a requirement of structure of cases and parts for size reduction and a requirement of structure of cases and parts for noise reduction are not met.

For instance, recently, a cellular phone, which has a first case, a second case and a hinge part connecting the first case and the second case to allow the rotation of them and enabling to be opened and closed, is widely used. In the cellular phone, the miniaturization when the user carries it is attempted by composing the both cases to be openable and closable. However, in such a cellular phone, antenna characteristics may change between in an opened state and in a closed state because the position of the one case provided with an antenna and the other case changes between when opening and closing the terminal. Therefore, it is difficult to improve the antenna gain in the both of the opened state and the closed state. In other words, it is difficult to achieve the reduction of the noise to the signal.

Moreover, for instance, a cellular phone having a shield for shielding the noise in the case has been known. However, the shield has bulky size. Therefore, the arrangement of the shield, etc. adversely affects the miniaturization of the wireless communication apparatus.

As a countermeasure for overcoming the disadvantage that the antenna characteristics are changed when opened and when closed the cases, a walkie-talkie machine has been proposed (JP 2003-101623 A (2003)). The walkie-talkie machine has a first antenna arranged in a first case, a second antenna arranged in a second case, and a switching part switching between the first antenna and the second antenna according to the state of an open or close of the terminal as the antenna used for communication. Further, a technology for arranging an antenna inside a walkie-talkie machine is proposed, but it does not show countermeasures to overcome the disadvantage that the antenna characteristics are changed (JP 10-163748 A (1996), JP 11-312912 A (1999)).

Moreover, as a technology concerning the miniaturization of the terminal having the shield, a technology that uses a shielding case as a reinforcement member of the battery is proposed (JP 2002-261894 A (2002)).

In JP 2003-101623 A, the reduction of the antenna gain because of the change of the state of the case: opened or closed, is supplemented between the first antenna and the second antenna, to prevent the reduction of the transmission and reception efficiency. But it does not disclose the technology that prevents the reduction of the antenna gain.

In JP 2002-261894 A, the shield is used as a reinforcement member in addition to the shield member, and thus the case is miniaturized only by the size that corresponds to the reinforcement member. But the above technology does not disclose that the shield is used for the arrangement of the other parts.

It is an object of the present invention to provide an wireless communication apparatus that a freedom of the design relating to miniaturization thereof can be improved together with the noise reduction.

SUMMARY OF THE INVENTION

In the present invention, an wireless communication apparatus includes a first case and a second case connected on each end to be able to open and close. The first case is provided with an antenna element in an end opposite to the connected end. The second case is provided with a first display unit displaying an image on a facing surface facing the first case in a closed state, a first drive unit driving the first display unit, a second display unit displaying an image on a back surface which is behind the facing surface, a second drive unit driving the second display unit, a frame provided between the first display unit and the second display unit and touching a back of the first display unit. The frame, the first drive unit and the second drive unit are arranged without overlapping the antenna element in the closed state, the second display unit is layered on the frame to overlap the second display unit and the antenna element in the closed state.

Preferably, the wireless communication apparatus includes a holder made of non-electric conductive material and holding the second display unit. The holder holds the second display unit at the position overlapping the antenna element and has a projected piece projecting to a position not-overlapping the antenna element in the closed state, and the second drive unit is arranged on the projected piece.

Preferably, the wireless communication apparatus includes a holder made of non-electric conductive material and holding the second display unit, the holder holding the second display unit at a position overlapping the antenna element and having a projected piece projecting to the position not-overlapping the antenna element in the closed state. A pressing arranged on the projected piece. A pressing member arranged on the pressing switch to expose on the back and is possible to press the pressing switch when the pressing member is pressed from the back surface.

Preferably, the second display unit has a chamfered end. The chamfered end overlaps the antenna element in the closed state and is chamfered along an inside of the second case. An end of the antenna element as arcuate along an inside of the first case, and surrounds the chamfered end in the closed state.

Preferably, the wireless communication apparatus includes a circuit board having a high-frequency circuit; a shield shielding the high-frequency circuit; and an electricity sound converter having an terminal on one side, and a sound input or output part on the other side, and arranged on a circuit board's surface on which the high-frequency circuit is arranged. The shield has a shield opening of width which is smaller than the electricity sound converter. The electricity sound converter is sandwiched between the shield which arranged to the terminal side and the circuit board which arranged to the input or output part side, and fixed to the shield opening.

Preferably, the shield has a wall portion which surrounds the electricity sound converter, and has a boss adjacent to the wall portion. The circuit board and the shield are fixed each other by a screw which is penetrated the circuit board and fits the boss.

Preferably, the shield has a holder into which the electricity sound converter is fitted. The terminal has a first contact at a center and a second contact at a position away from the center. The circuit board has a third contact at a center of an area facing to the holder and has a fourth contact arranged on the circumference of predetermined radius which centers on the third contact.

Preferably, a wiring board having a pressing switch is provided on the other side of the shield against the circuit board, and has a board opening at a position corresponding to the shield opening.

Preferably, the wireless communication apparatus includes a wiring board arranged on the other side of the shield against the circuit board; a plurality of pressing switches arranged on the wiring board; a plurality of pressing members arranged on the plurality of pressing switches respectively, and having translucency; and a plurality of light emission devices arranged on the wiring board. The pressing switch and the pressing member are arranged in at least two rows, the plurality of light emission devices are arranged at every other space located between the two rows consecutively. A board opening is provided on the wiring board at one of the space where the light emission devices are not arranged, and faces to the shield opening.

Preferably, the wireless communication apparatus includes a key sheet which is arranged on the wiring board and has a pressing member facing to the pressing switch and has translucency to the pressing member; and a light emission device arranged between the wiring board and the key sheet. The first case has a upper cover arranged on the wiring board's side and a lower cover arranged on the circuit board's side. A key sheet opening is provided in the key sheet at a position facing to the board opening. The upper cover is provided with a upper cover opening which opens above the key sheet opening, and a wall portion having a cylindrical shape, continuing from the edge of the upper cover opening to the inside of the case, and inserted into the key sheet opening.

Preferably, the wireless communication apparatus includes a board side connection part which electrically connects the wiring board, and is arranged between the circuit board and the shield, a wiring board side connection part which is provided on a projected piece formed in an end of the wiring board, and connects to the board side connection part by folding back the projected piece.

Preferably, the wireless communication apparatus includes an electronic part controlled through the wiring board, being connected to a projected piece formed in the end of the wiring board, and being arranged on the other side of the circuit board against the high-frequency circuit by folding back the projected piece.

Preferably, the circuit board and the shield are accommodated in the first case. A power supply terminal is arranged on the other side of the circuit board against the shield, and is arranged on a end of the circuit board. The antenna element is formed in a curved-surface shape expanding so that the antenna element faces a range of a direction that the circuit board's surface having the power supply terminal faces to a direction that is outside of the shield, is arranged the outside of the shield and the inside of the case, and is supplied with power by the power supply terminal.

Preferably, the first case or the second case accommodates the circuit board and the shield between an upper cover and a lower cover. A boss fixing the upper cover and the lower cover each other by a screw is arranged in the upper cover or the lower cover. A cut away portion or a hole, into which the boss fits, is provided in the circuit board and the shield.

BRIEF DESCRIPTION OF THE DRAWINGS

The above and other objects and features of the present invention will be apparently with reference to the accompanying drawing, in which.

DESCRIPTION OF THE PREFERRED EMBODIMENTS

Figure 1:
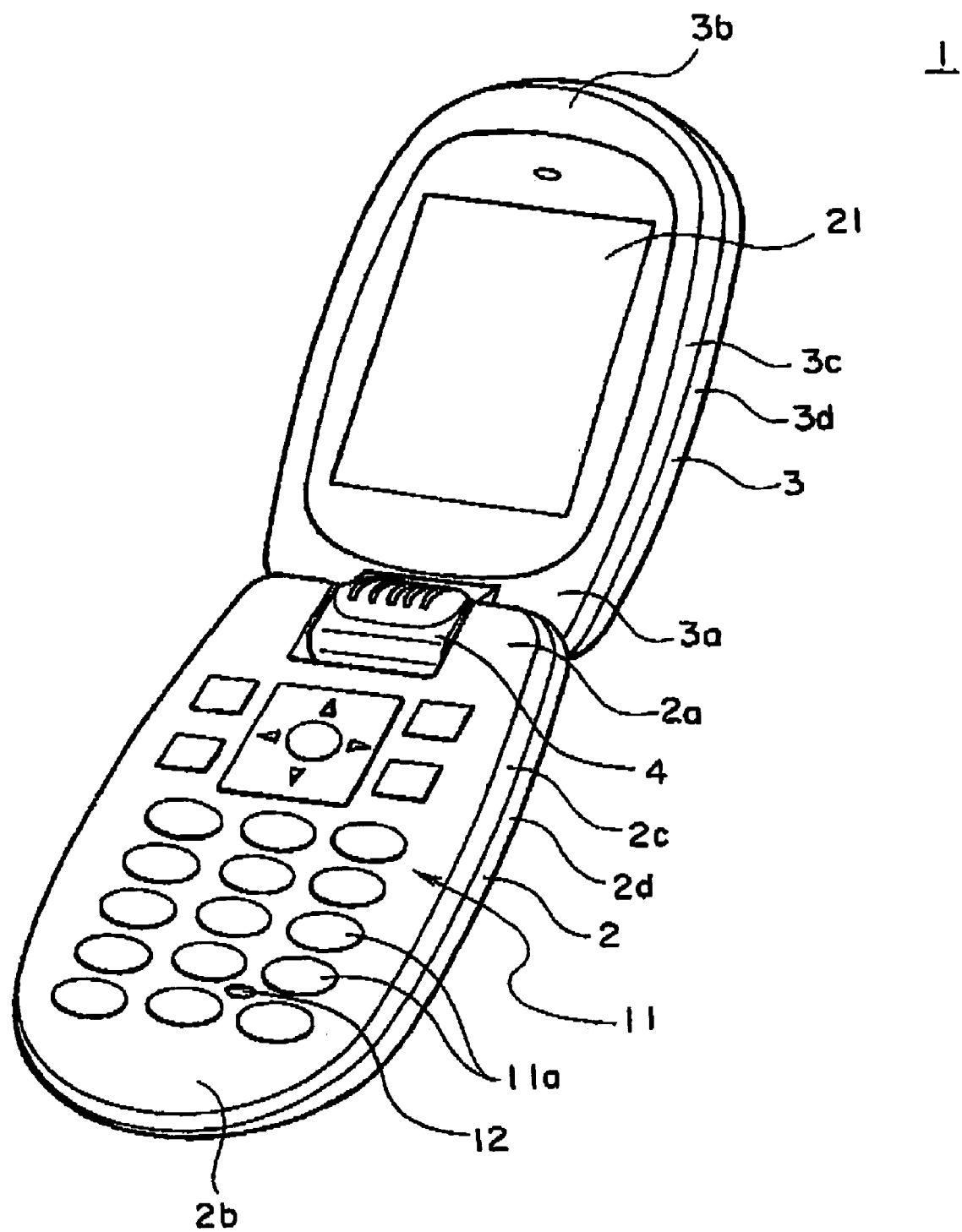
FIG. 1 is a perspective outer view of a cellular phone in an opened state of an embodiment according to the present invention.
Figure 2:
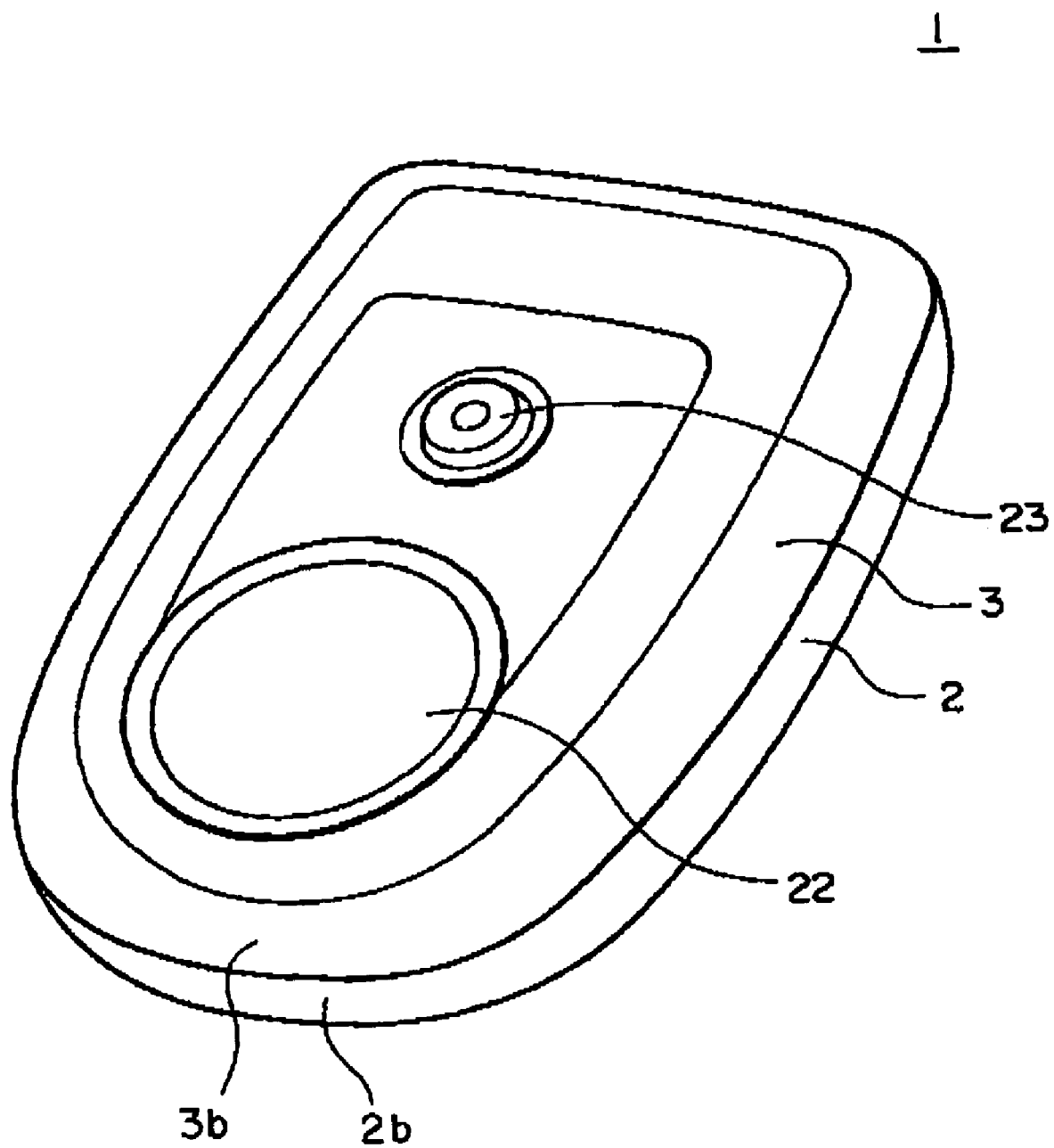
FIG. 2 is a perspective outer view of the cellular phone in a closed state of the embodiment according to the present invention.

FIG. 1 and FIG. 2 are perspective view of a cellular phone 1 of the embodiment according to the present invention. The cellular phone 1 is one example of an wireless communication apparatus (electric apparatus) of the present invention. FIG. 1 shows an opened state of the cellular phone 1 and FIG. 2 shows a closed state of the cellular phone 1.

The cellular phone 1 has a first case 2 and a second case 3. An end 2a of the first case 2 and an end 3a of the second case 3 are connected to each other by a hinge unit 4 to be allowed a rotation of them, therefore, the end 2a and end 3a function as a fulcrum and the cellular phone 1 can be opened and be closed.

The first case 2 has a first front side case (upper cover) 2c on a front side that faces to the second case 3 in the closed state and a first back side case (lower cover) 2d on a back side. The second case 3 has a second front side case 3c on a front side that faces to the first case 2 in the closed state and a second back side case 3d on a back side. These cases 2c, 2d, 3c and 3d are formed so that these outlines match each other when the one case side is seen from the other case side in the closed state. Therefore, a position of an end 2b and a position of an end 3b, which are the ends on the other side (opened-and-closed side) of the cases against the ends connected each other, are same in the closed state.

The first case 2 has an operation unit 11 in the front of the cellular phone 1. The operation unit has a plurality of buttons (pressing members) to operate the cellular phone 1, such as ten-key buttons 11a for entering numbers 0-9 thereinto. Moreover, in the operation unit, an opening 12 for collecting sound is provided in an area where the ten-key buttons are arranged. The protection film may been arranged in the opening 12 for the purpose of preventing the insertion of dust etc into the first case 2.

The second case 3 has a main display unit (first display unit) 21, which displays images on a front surface (facing surface) of the second case 3, and is arranged along the front surface; and a sub display unit (second display unit) 22, which displays images on a back surface of the second case 3, and is arranged along the back surface. An opening window, which is provided in the second back side case 3d to expose the sub display unit 22, is formed in a circle shape. For instance, the main display unit 21 and the sub display unit 22 are composed of liquid-crystal displays which are light-transparent type or light-reflection type. Further, the main display unit 21 and the sub display unit 22 may be composed of the other devices such as an organic-electroluminescence type display.

Moreover, the second case 3 has a push button (pressing member) 23 which is arranged (expose) on the back surface to control an operation of the sub display unit 22. For instance, the push button 23 is made of resin or hard rubber, and can move in vertical direction against a surface which is a portion of the second back side case 3d and in which the sub display unit 22 is arranged.

Figure 3:
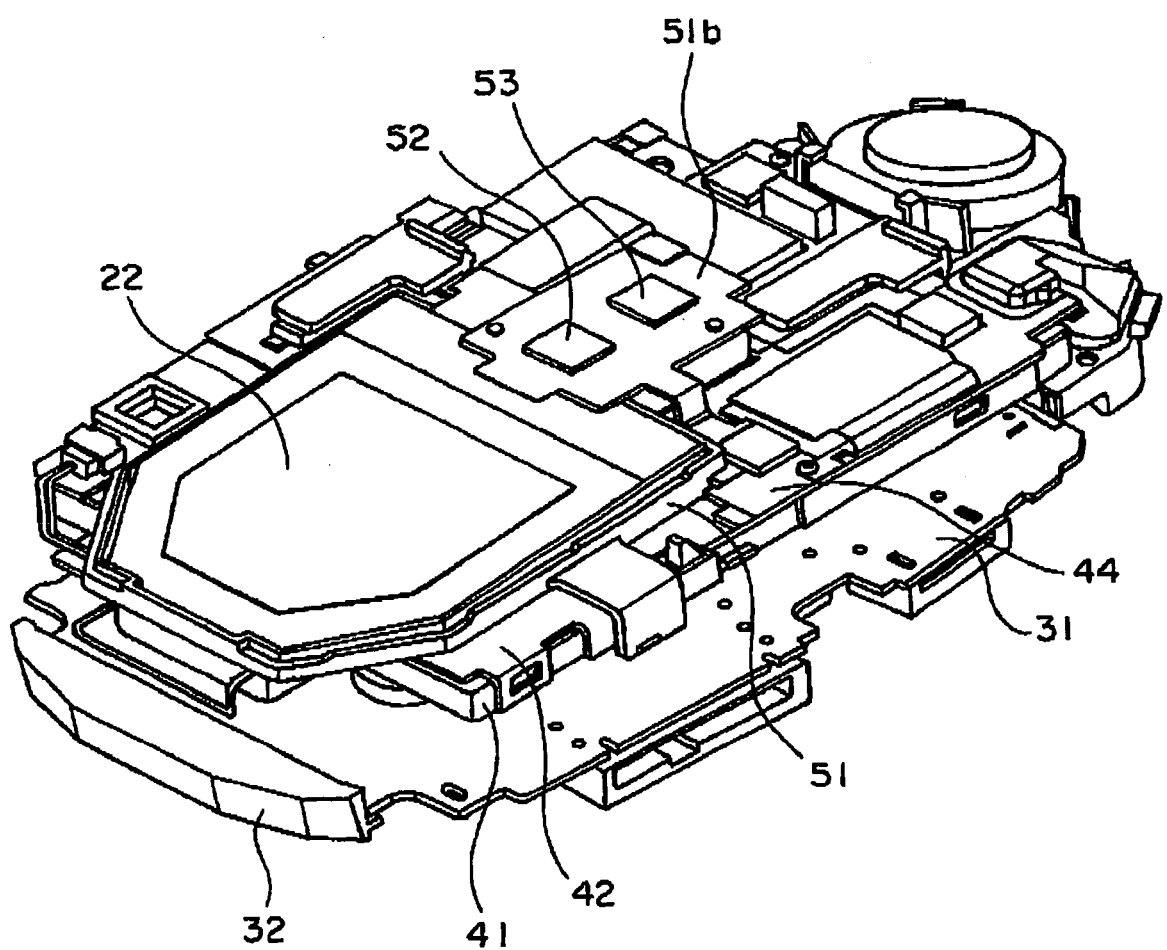
FIG. 3 is a perspective view of internal components of the cellular phone in a closed state of the embodiment according to the present invention.
Figure 4:
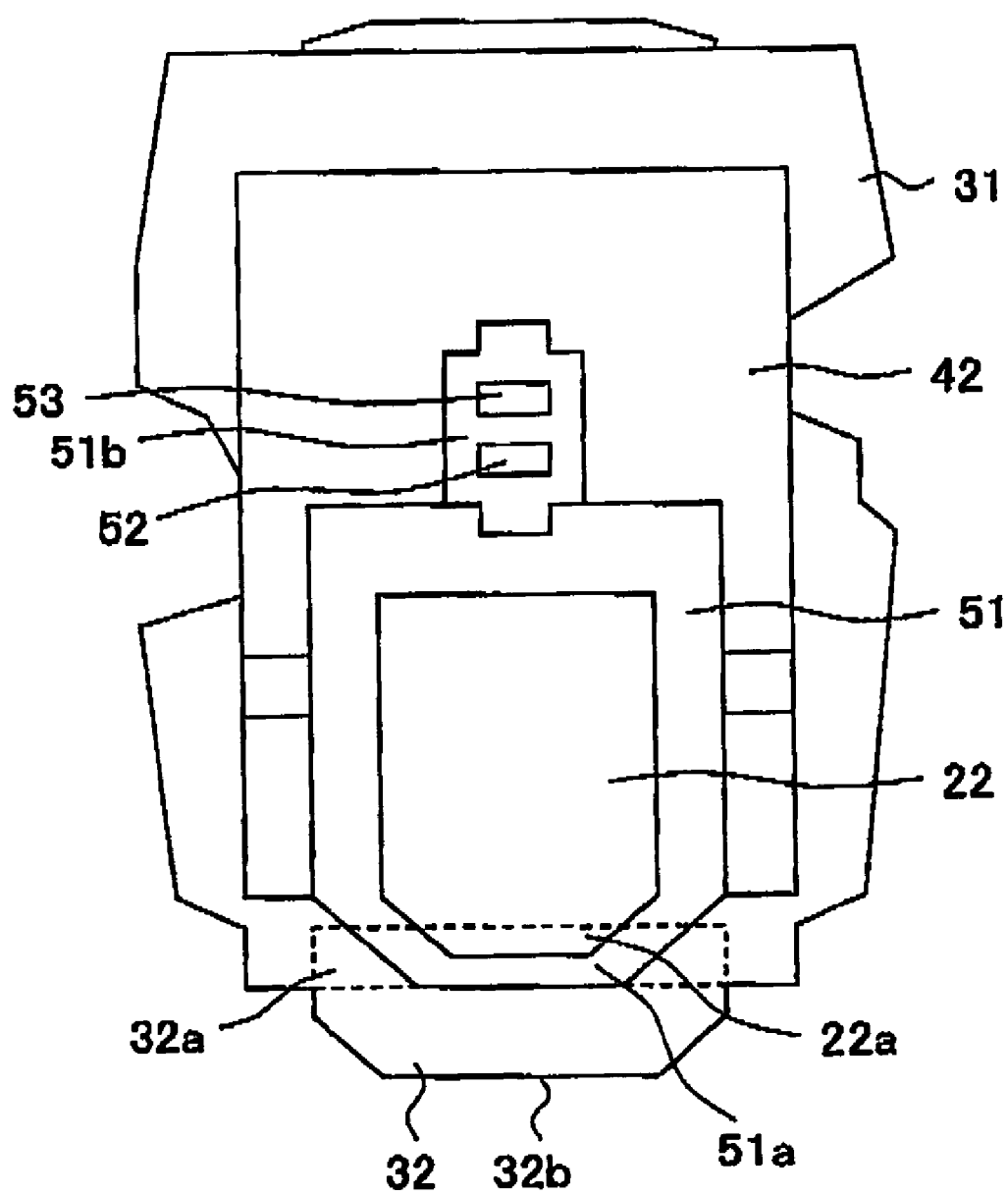
FIG. 4 is a plan view of the internal components of the cellular phone of the embodiment according to the present invention in a closed state.

FIG. 3 is a perspective view and FIG. 4 is a plan view of internal components of the cellular phone 1 in the closed state. Some parts of the component are omitted in these figures.

In the first case 2, a circuit board 31 having various circuits such as a high-frequency circuit, and an antenna 32 to transmit and receive high-frequency electric waves are provided. The antenna 32 is arranged at an end of the circuit board 31, and is located in the end 2b of the first case 2.

In the second case 3, a main display unit holder 41 holding a surround portion and a back portion of the main display unit 21, main display unit frame 42 which is arranged along a back of the main display unit holder 41 and which reinforces the main display unit 21 and the main display unit holder in a viewpoint of structural strength, and a sub display unit holder 51 holding a surround portion and a back portion of the sub display unit 22 are arranged. For instance, the main display unit holder 41 and the sub display unit holder 51 are made of non-electrical-conductive plastic, and the main display unit frame 42 is made of metal. A frame, which touches a back portion of a first display unit, is composed of the main display unit holder 41 and main display unit frame 42.

As shown in FIG. 4, the main display unit 21, the main display unit holder 41 and the main display unit frame 42 are arranged so that they don't overlap the antenna 32 in the closed state. The sub display unit 22 and the sub display unit holder 51 are arranged so that the ends 22a and 51a on the opened-and-closed side of them overlap an end 32a on the connected side of the antenna 32 in the closed state. The sub display unit holder 51 holds a part which is a portion of the sub display unit 22 and which overlaps the antenna 32.

The ends 22a and 51a on the opened-and-closed side of the sub display unit 22 and the sub display unit holder 51 are chamfered in view of the back side of the second case 3 respectively. In other words, the ends 22a and 51a are chamfered along an inside of the second case 3. An end 32b of the opened-and-closed side (the end facing outside of the first case in the view of the back of the first case) of the antenna 32 is formed in a circular arc surrounding the ends 22a and 51a. In other words, the end 32b is formed as arcuate along the inside of the first case 2. Details of the antenna 32 are described later.

On the connected side of the sub display unit holder, a tongue piece (projected piece) 51b projecting to the connected side is provided. On the tongue piece (back side of the second case 3), a drive unit 52 carrying out a predetermine control such as an electric connection control of the sub display unit 22, and a pressing switch 53 which is connected to the drive unit 52 and makes contacts to be touched or to be detouched according to a pressing operation. For instance, the drive unit 52 is composed of an IC. The push button 23 is arranged on the pressing switch 53 (the push button 23 faces to the pressing switch 53), and pressing switch 53 is pressed by a push operation against push button 23.

Figure 5:
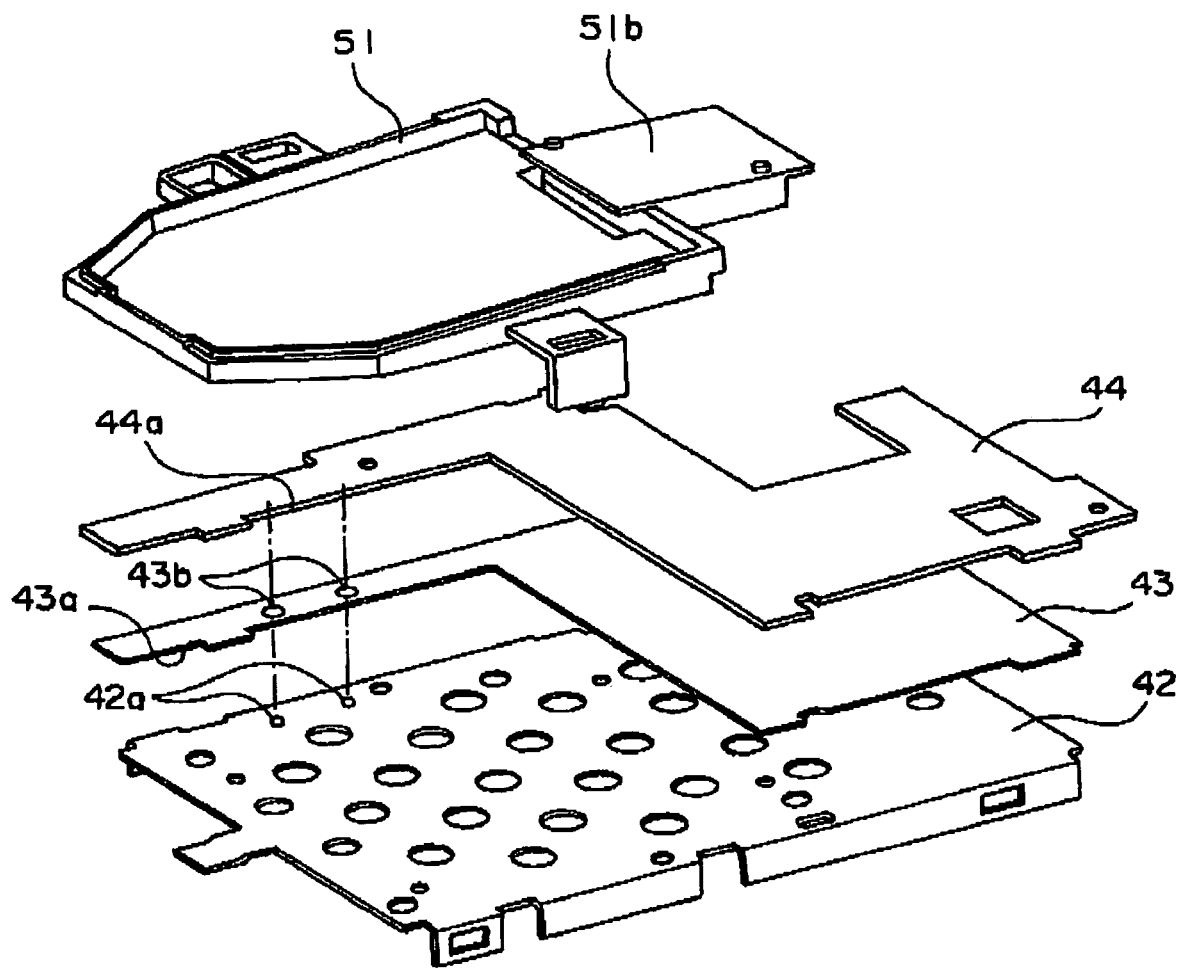
FIG. 5 is an exploded perspective view of the internal components of a second case of the cellular phone of the embodiment according to the present invention.

FIG. 5 is an exploded perspective view of a part of the internal components of the second case 3. As shown in FIG. 5, on a back of the main display unit frame 42, an insulation sheet 43, and a circuit board 44 carrying out a predetermined control such as an electric connection control of the main display unit 21 are arranged. Cut-away portions 43a and 44a are provided on the opened-and-closed side of the insulation sheet 43 and the circuit board 44, and the sub display unit holder 51 is arranged so that it touches the back of the main display unit frame 42 rather than the half of a back of the sub display unit holder 51 through the blank formed by cutting away. The backs which touch each other, may be connected each other with a connection member such as an adhesive tape having adhesive material on the both faces, or are not necessary to connect each other with the connection member.

In the main display unit frame 42, projection portions 42a are provided at positions that are sides of a position touching the sub display unit holder 51 thereto. The projection portions 42a contact to the circuit board 44 through holes 43b of insulation sheet, therefore, the circuit board 44 is electrically connected to the main display unit frame 42.

Figure 6:
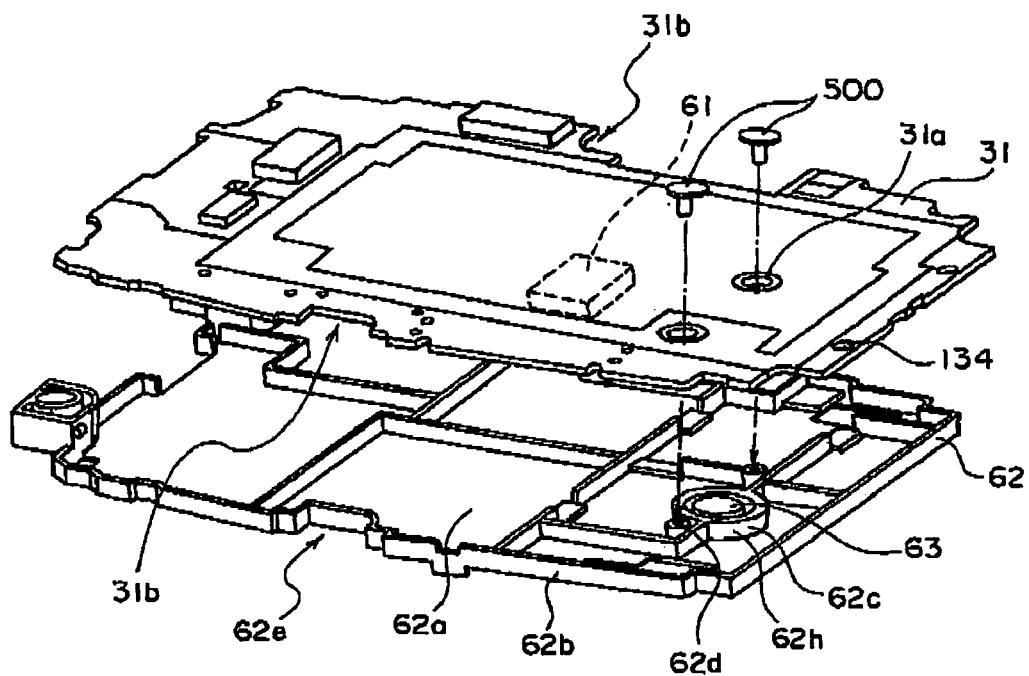
FIG. 6 is an exploded perspective view of the internal components of a first case of the cellular phone of the embodiment according to the present invention.
Figure 7:
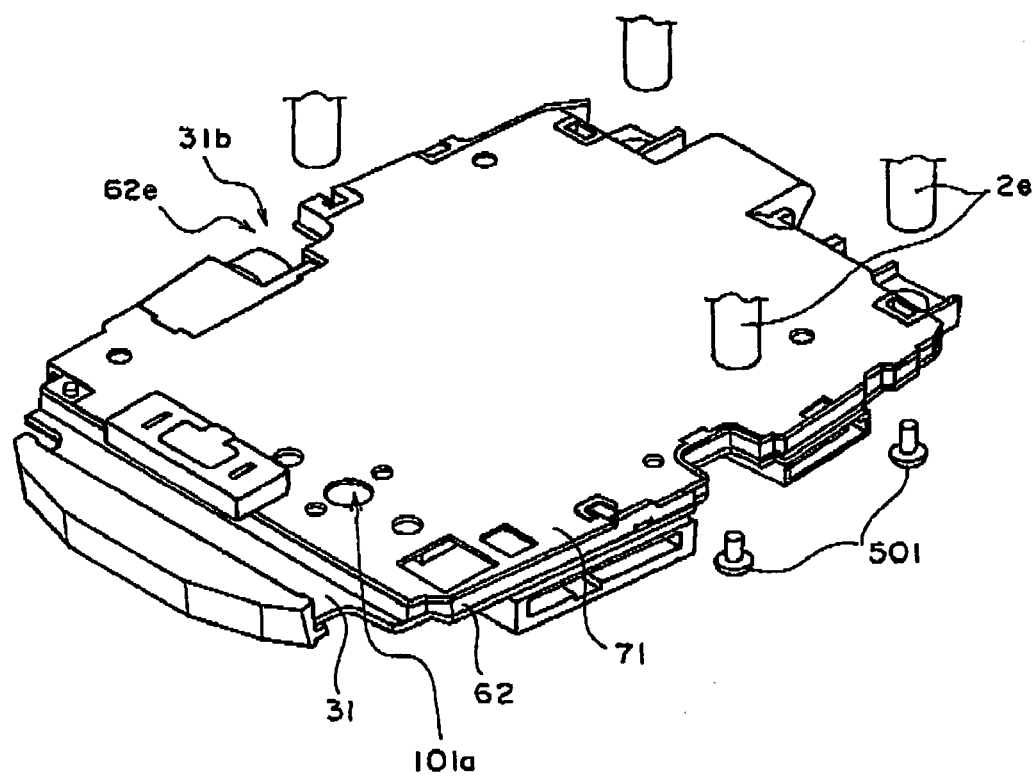
FIG. 7 is a perspective view of the internal components of the first case of the cellular phone of the embodiment according to the present invention.

FIG. 6 and FIG. 7 are exploded perspective views of a part of the internal components of the first case 2. In FIG. 6, a left side of the figure shows the connected side, and the upper side of the figure shows the back side of the first case 2. In FIG. 7, upper side, lower side, right side, and left side are opposite to those in FIG. 6.

Various circuits such as a high-frequency circuit 61 are arranged on the front side (lower side of FIG. 6) of the circuit board 31. The circuits are covered with a shield case (shield) 62 to shield the electromagnetic radiation emitted from the respective circuits or applied. from the outside to the circuit. On the shield, a flexible printed wiring board 71 is arranged.

The shield case 62 has a plate 62a, partition 62b which is provided at a surrounding portion and inside of the plate 62a and divides the plate 62a, a microphone holder 62c holding a microphone (electricity sound converter) 63, and bosses 62d which are arranged adjacent to the microphone holder 62d.

Screws 500 inserted into holes 31a from a back side of the circuit board 31 are attached to the bosses 62d, therefore, the circuit board 31 and the shield case 62 are fixed each other.

Screws 501 penetrated the first back side case 2d are attached to the bosses 2e arranged on the other side of the first front side case 2c, therefore, the first front side case 2c and the first back side case 2d are fixed each other. Cut-away portions 31b and 62e, into which the bosses 2e are fitted, are provided in the circuit board 31 and the shield case 62, therefore, the circuit board 31 and the shield case 62 are fixed each other by fixing the first front side case 2c and the first back side case 2d each other. Instead of the out-away portions 31b and 62e, holes may be provided in the circuit board 31 and the shield case 62. The shield case 62 is formed by plating process of a surface of the resin member with an electrical conductive material, therefore, the shield case 62 becomes in an electronic conductive state. The shield case 62 is fixed to the circuit board 31 in a state that the shield case 62 is electrically connected to a ground line of the circuit board 31.

Figure 8A:
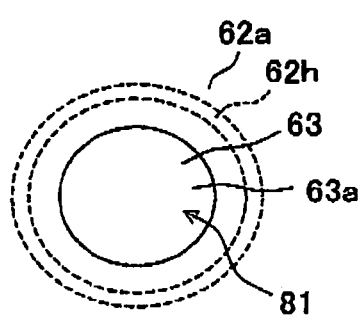
FIG. 8A to FIG. 8C are plane views of a microphone and it neighbor portion of the cellular phone of the embodiment according to the present invention.
Figure 8B:
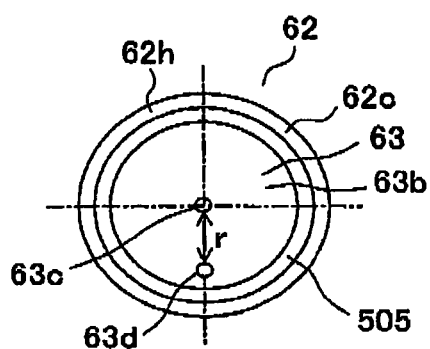
Figure 8C:
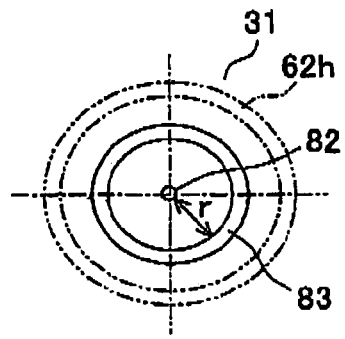

FIG. 8A shows the microphone holder 62c and microphone 63 which is seen from the front side of the first case 2 (lower side of FIG. 6), FIG. 8B shows the microphone holder 62c and microphone 63 which is seen from the back side of the first case 2, FIG. 8C shows a position of the circuit board 31 facing to the microphone holder 62c.

The microphone 63 is composed in a columnar shape having a sound input part 63a on one end face and an terminal 63b on the other end face. On the other hand, a microphone holder 62c has a wall: portion 62h formed in a cylindrical shape of which a size can accommodate the microphone 63. The wall portion 62h continues the partition 62b, and a thickness and a height of the wall potion 62h are approximately the same as those of a partition 62b (Refer to FIG. 6). The purpose of the provision of the partition 62b is to isolate the respective circuits of the circuit board 31 from each other, or to reinforce the structural strength of the shield case 62.

A packing 505, which is made of elastic material such as rubber, is attached to the microphone 63, then the microphone 63 is fitted into the microphone holder 62c from the sound input part 63a. In addition, the circuit board 31 and the shield case 62 are fixed each other as above-mentioned, and the microphone 63 is sandwiched between the plate 62a of the shield case 62 arranged on the sound input part 63a side and the circuit board 31 arranged on the terminal 63b side, and are fixed the shield case 62 and circuit board 31. The sound input part 63a has a vibration plate for vibrating to voices and converting the same to electric signals. Instead of the provision of the packing 505, an outside diameter of the microphone 63 and an inside diameter of the microphone holder 62c may be set so that the microphone 63 is directly fitted into the microphone holder 62c. An elastic member may be arranged between the sound input part 63a and the plate 62a.

An opening 81 of which an inside diameter is smaller than the diameter of the microphone 63 is provided in the plate 62a inside the microphone holder 62c of shield case 62. The opening 81 may be formed in any suitable shape and any suitable size under the condition that the microphone 63 is supported by the plate 62a arranged on the sound input part 63a side.

The terminal 63b of the microphone 63 has a first contact 63c at a center of the terminal 63b and a second contact 63d arranged at a position of a distance r away from the first contact. On the other hand, the circuit board 31 has a third contact 82 arranged at a center of an area facing to the microphone holder 62c and a fourth contact 83 on the circumference with respect to a center of the third contact 82 and having a radius r. The first contact 63c contacts to the third contact 82, and the second contact 63d contacts to the fourth contact 83 when the microphone 63 is sandwiched by the circuit board 31 and the shield case 62. The fourth contact may not continue on the circumference as long as the fourth contact is separated by the distance r away from the third contact 82. If the microphone 63, which is shown in the column shape in the present embodiment, is formed to have a rotation symmetry shape against the third contact, such as a square pillar, the fourth contact may be arranged at the position facing to the second contact. This is substantially same as arranging the fourth contact on the circumference.

Figure 9:
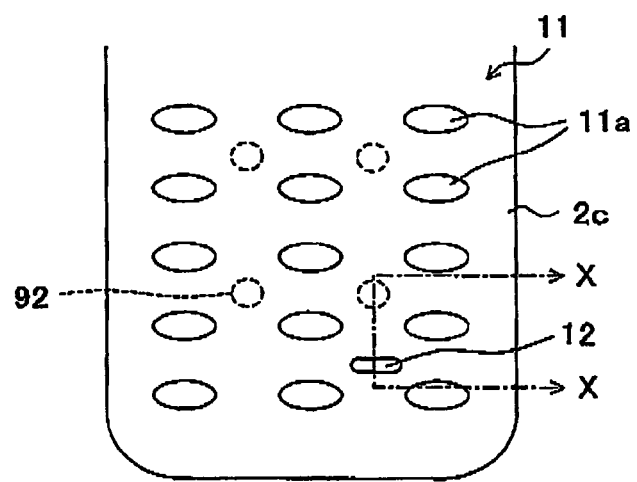
FIG. 9 is a plane view of an operation unit of the cellular phone of the embodiment according to the present invention.
Figure 10:
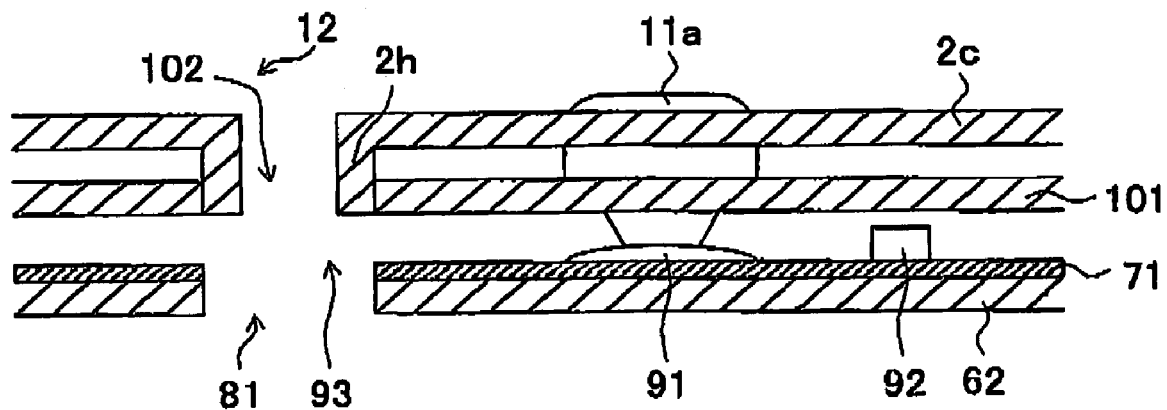
FIG. 10 is a cross section view of the operation unit of the cellular phone of the embodiment according to the present invention.

FIG. 9 is a plane view of the operation unit 11, and FIG. 10 is a cross section view taken along lines X-X of FIG. 9. FIG. 10 shows the shield case 62 and the other parts above the shield case 62.

As shown in FIG. 10, on the flexible printed wiring board, pressing switches 91 arranged to correspond to the keys of the operation unit 11 such as the ten-key buttons, and light emission devices 92 to illuminate the keys of the operation unit 11 are arranged. On them, a key sheet 101 having the keys of the operation unit 11, and the first front side cave 2c are arranged. The ten-key buttons 11a are made of material which allows light transmit (material having translucency), such as resin.

An opening 93 is provided in the flexible printed wiring board 71. An opening 102 is provided in the key sheet 101. An opening 12 is provided in and the second front side case 2c. The openings 93, 102 and 12 are provided at the position corresponding to the opening 81 of the shield case 62 respectively In other words, the openings 93, 102, 12 and 81 face to each other. A wall portion 2h, which has cylindrical shape, continues from the edge of the opening 12 to the key sheet 101 side, and is inserted into the opening 102 of the key sheet 101, is provided in the first front side case 2c. The wall portion 2h may be provided over all surroundings of opening 12, and may be provided on only the side where light emission devices 92 are arranged.

As shown in FIG. 9, the ten-key buttons 11a are arranged in three rows which continue in a vertical direction of the figure, and the light emission devices 92 are arranged between the adjacent rows respectively. Moreover, the light emission devices 92 are arranged between the ten-key buttons 11a and at intervals of one in the vertical direction. In other words, the light emission devices 92 are arranged between four ten-key buttons. An opening 12 is arranged at one position among positions between four ten-key buttons 11a. The position at which the opening 12 is arranged, is a position at which the light emission devices 92 are not arranged.

Figure 11:
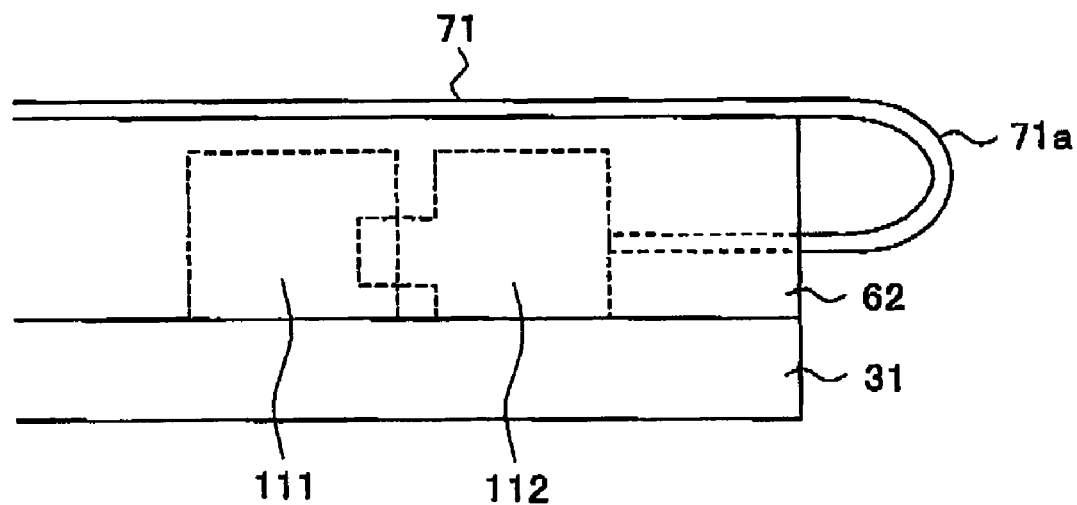
FIG. 11 is a side view of a conduction means of a flexible wiring board of the cellular phone of the embodiment according to the present invention.

As shown in FIG. 11, the flexible printed wiring board 71 has a tongue piece (projected piece) 71a projecting outside of the shield case 62, and a connection unit 12 provided on the tongue piece 71a. The tongue piece 71a are folded back, then the connection unit 112 and the connection unit 111 arranged on the circuit board 31 are connected each other, therefore, the flexible printed wiring board 71 and the circuit board 31 are connected each other electrically.

Figure 12:
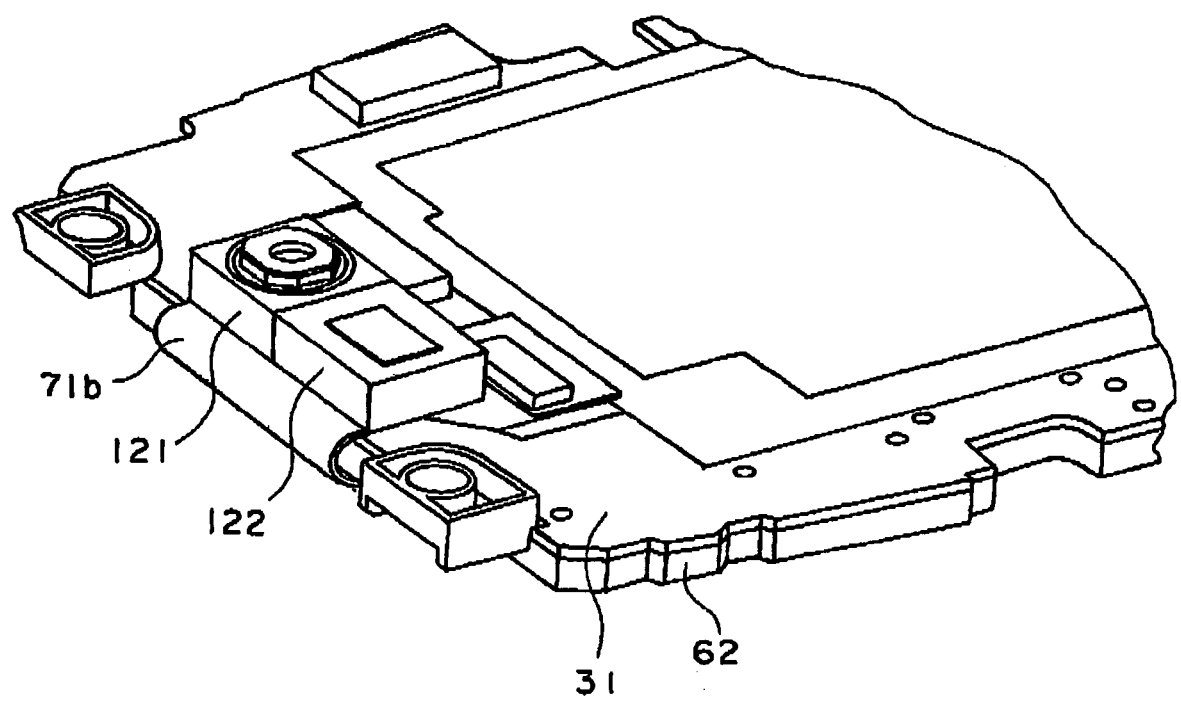
FIG. 12 is a perspective view of a camera module of the cellular phone of the embodiment according to the present invention.

As shown in FIG. 12, on the back side (upper side of the figure) of the circuit board 31, a camera module (electronic part) 121 and a light emission part (electronic part) 122 for flashing a light are arranged. A tongue piece (projected piece) 71b arranged on the end of the flexible printed wiring board is folded back, and is connected to the camera module 121 and the light emission part 122 electrically, therefore, the camera module 121 and the light emission part 122 are controlled by a circuit in the flexible printed wiring board 71 or a circuit of the other board connected the flexible printed wiring board 71.

Figure 13A:
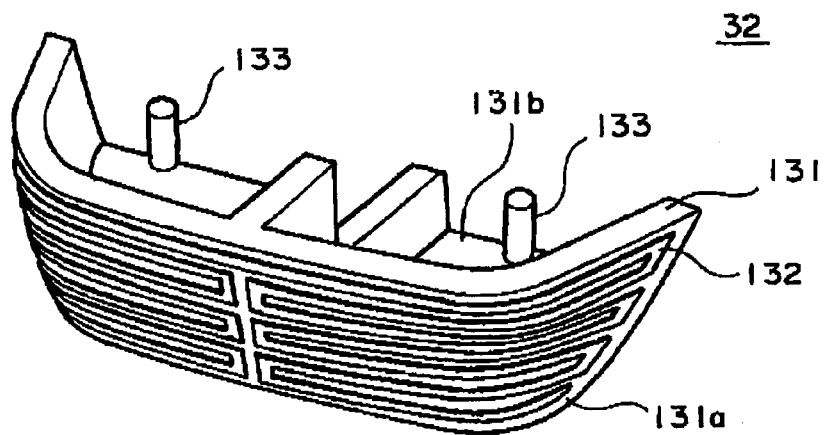
FIG. 13A and FIG. 13B are perspective view of an antenna of the cellular phone of the embodiment according to the present invention.
Figure 13B:
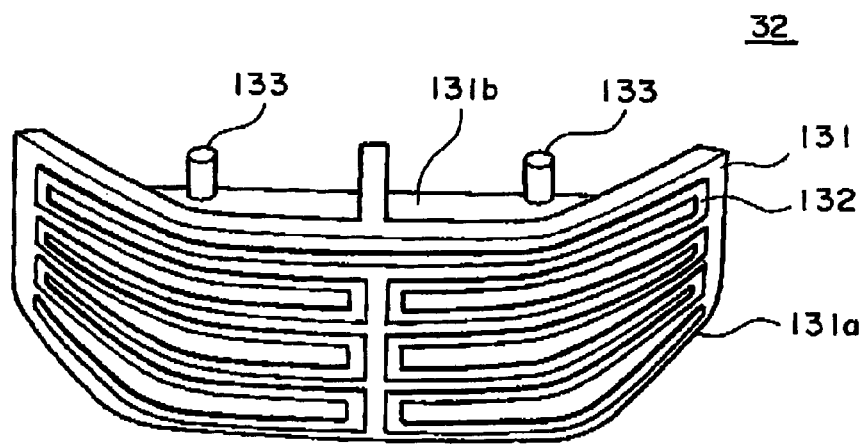

FIG. 13A is a perspective view of the antenna 32 seen from the same direction as in FIG. 3, and FIG. 13B is a perspective view of the antenna 32 seen from upper side and the opened-and-closed side of the first case 2. The antenna 32 has a base portion 131 attached to the circuit board 31, an antenna element 132 arranged on the case portion 131, and power supply terminals 133 for supply an electronic power to the antenna element 132.

The base portion 131 is made of non-electrical conductive member such as resin, and has a curved surface 131a facing to an inner wall of the end 2b (refer to FIG. 1) of the first case 2, and a frame portion 131b arranged inside the curved surface 131a. The curved surface 131a is formed to face directions within a range from a direction of the back side of the first case 2 to a direction of the opened-and-closed side, and to projects to the opened-and-closed side in the view of the back side. And the curved surface 131a is arranged outside of the shield case 62 in the view of the back side.

The frame 131b is formed to touch the back of the circuit board 31 and the end on the opened-and-closed side of the circuit board 31. In the frame 131b, the power supply terminals 133 are arranged at a position facing to the back of the circuit board 31. The power supply terminals 133 are electrically connected to power supply terminals 134 arranged at the back side of the circuit board 31.

The antenna element 132 is made of the sheet metal such as the phosphorus bronzes and formed in a predetermined pattern shape. The antenna element 132 is arranged over all area of the curved surface 131a, and a projection area of the antenna element 132 approximately match to a projection area of the antenna unit 32 in the view of the front side of the first case 2, therefore, descriptions of the arrangement of the antenna unit 32 with reference to FIG. 3 and FIG. 4 can be applied to descriptions of arrangement of the antenna element 132.

Figure 14:
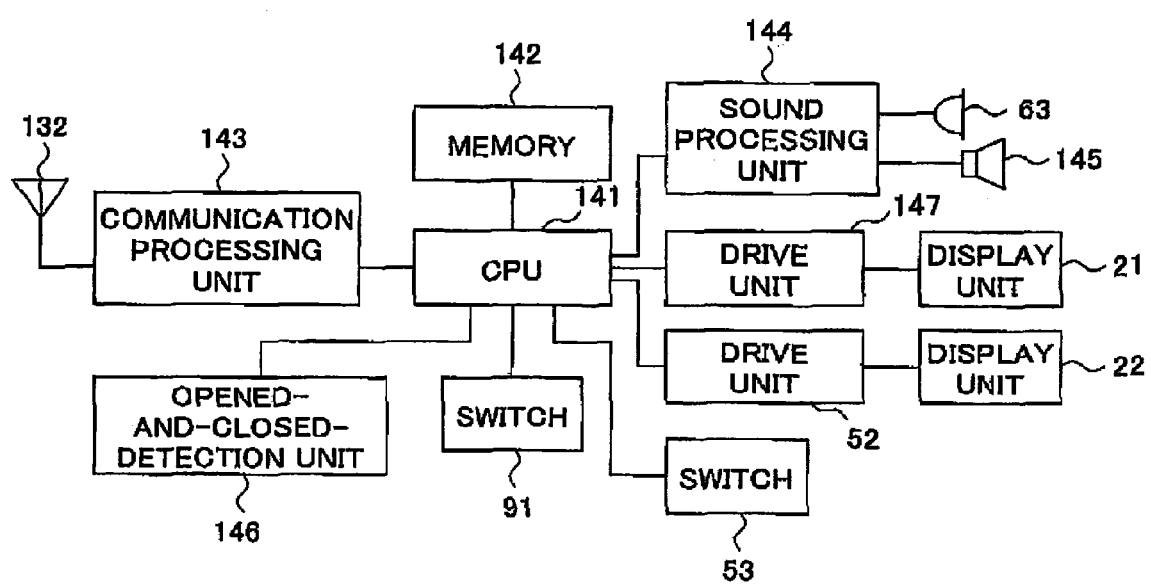
FIG. 14 is a block diagram of the components of the cellular phone of the embodiment according to the present invention.

FIG. 14 is a block diagram of one example of the components of the signal processing system of the cellular phone 1. The cellular phone 1 has a CPU 141, a memory 142, a communication processing unit 143, the antenna element 132, a sound processing unit 144, the microphone 63, a speaker 145, an opened-and-closed-detection unit 146, the pressing switches 91 and 53, the main display unit 21, sub display unit 22, and the drive units 147 and 52.

The CPU 141 and the memory 142 are formed by an IC arranged on the circuit board 31, execute predetermined operations based on signals from various means in the cellular phone 1 to control the various means.

The communication processing unit 143 includes the high-frequency circuit 61, modulates various data which are processed by CPU 141 such as sound data and image data, and transmits the signals through the antenna element 132 to perform wireless communications using the high frequency electric wave. Moreover, the communication processing unit 143 demodulates signals received through the antenna element 132, and outputs the data to the CPU 141.

The sound processing unit 144 converts the data from the CPU 141 into the sound signals, and outputs them to the speaker 143. And the sound processing unit 144 converts sound signals into sound data, and outputs them to the CPU 141.

The opened-and-closed-detection unit 146 may be a switch which outputs, for example, an ON signals to the CPU 141 when an angle of the first case 2 and the second case 3 is greater than a predetermined angle, and an OFF signal when the angle is smaller than the predetermined angle.

The drive units 147 and 52 control the main display unit 21 and the sub display unit 22 based on signals from CPU 141 respectively. The drive unit 147 may be composed of an IC arranged on the circuit board 44, and may be arranged at a position not-overlapping to the antenna element 132.

According to the cellular phone 1 described above, in the closed state, the parts that the influence thereof on the antenna element 132 is comparatively small (low) are arranged at near the antenna element 132, and the parts that the influence thereof on the antenna element 132 is comparatively large (high) are arranged at a position away from the antenna element 132, therefore, the influence of the second case 3 on the antenna characteristics is greatly reduced compared with the conventional cellular phones.

In other words, even if the sub display unit 22 is arranged to overlap the antenna element 132 and the antenna element 132 is arranged in the first case 2, the influence on the antenna characteristics becomes small because the cross interference that the sub display unit 22 and the antenna element 132 becomes small. Therefore, a space in the end 3b, which is the end of the second case 3 and faces to the antenna element 132, can be effectively used. Namely, the freedom of the structural design of the cellular phone 1 can be improved. For example, outer shapes of the first case 2 and the second case 3 can be formed so that the ends 2b and 3b on the opened-and-closed side match each other, and the sub display unit 22 can be arranged on the end 3b side.

The sub display unit holder 51 is arranged so that the back thereof touch the back of the main display unit frame 42, therefore, the sub display unit holder 51 is fixed stable, and the structural strength of the sub display unit holder 51 is reinforced by the main display unit frame 42.

The drive unit 52 is arranged on the tongue piece 51b, therefore, an assembly work is easier than the conventional manner that a drive unit is arranged on a flexible printed wiring board connected to the drive unit, because, for example, the flexible printed wiring board is not peeled up in a manufacturing process. Of course, the improvement of a freedom of a three dimensional layout of parts can be achieved.

The distance between the back of the second case 3 and the pressing switch 53 is short because the pressing switch is arranged on the tongue piece 51b. Therefore, it is not necessary to form the push button 23 to be thicker in the press direction and/or to pile the other member onto the pressing switch 53 even if the thickness of the second case 3 is somewhat large. Moreover, the tongue piece 51b is arranged at the position not-overlapping the antenna element 132, therefore, user's hand operating the push button 23 does not affect the change of antenna characteristic of the antenna element 132.

An influence of the sub display unit 22 on the antenna element 22 is greatly reduced because the portion of the sub display unit 22 overlapping the antenna element 132 is chamfered.

Since the microphone 63 is sandwiched between the circuit board 31 and the shield case 62 and fixed them, the microphone 63 can be arranged in any position in a range that the circuit board 31 and the shield case 62 face each other, and it is not necessary to arrange the microphone 63 to avoid the position of the shielding case like conventional art. In other words, a freedom of the arrangement of the microphone is improved. In the apparatus miniaturized like the portable terminal, a very limited space inside the case must be distributed for the parts, and the improvement of the structural design for arranging the microphone results in the improvement of the positional design freedom for arranging other parts of the cellular phone 1. Consequently, a miniaturization of a portable terminal provided with an antenna can be achieved by, for example, allocating the space for the microphone in the conventional art for an antenna.

The microphone 63 is enclosed by the wall portion 62h of the microphone holder 62c arranged in the shield case 62, and the plate covering the shield case 62 covers the wall portion 62h, and the microphone 63 is guarded from noises.

The shield case 62 is fixed to the circuit board 31 by the screw 500, and then, the shield effect of the shield case 62 can be improved by raising the contact pressure between the shield case 62 and the ground line of circuit board 31. Moreover, in fixing by the screw 500, the boss 62d adjacent to the microphone holder 62c is used, therefore, the vibration of microphone 63 is absorbed by the whole of the circuit board 31 and the whole of the shield case 62, and a large local vibration generated at a near the microphone 63 is suppressed. As a result, the reduction of the shield effect by the vibration is avoided.

The first contact 63c contacts to the third contact 82 and the second contact 63d contacts the fourth contact 83 regardless of the direction of the microphone 63, therefore, when the microphone 63 is attached to the cellular phone 1, it is free from a careful work about a rotational shift in the direction of the circumference of the fourth contact 83, and the electrical connections of the microphone 63 can be surely established.

It is possible to provide the shield case 62 in the wide space of the cellular phone 1 because it is not necessary to avoid the overlap between the shield case 62 and the microphone 63. Therefore, the flexible printed wiring board 71 having the plurality of pressing switches 91 can be arranged in the shield case 62. In addition, since the shield case 62 can be arranged over the wide range of the circuit board 31, the entire strength of the cellular phone 1 becomes even and a twist strength etc. thereof is also improved.

The regulation of the relation between the array of the light emission device 92 and the array of the keys of the operation part 11 is kept, and the non-arranged position of the light emission device 92 is set, therefore, the variation of the amount of the illumination of the keys is small together with the arrangement space for the opening 12 is insured.

Because the opening 12 and the wall potion 2h, which is inserted into the opening 102 or the key sheet 101, are provided in the first front side case 2c, the sound path for guiding the sound from the outside to the microphone 63 is insured. In addition, the key sheet 101 also used as a light guiding member for illuminating the ten-key button 11a etc. is not exposed the outside from the opening 12, therefore, it is suppressed the leakage of the light of light emission device 92 from the opening 12 to the outside.

The tongue piece 71a is folded back, and the connection unit 112 and the connection unit 111 are connected each other at a position where the circuit board 31 is covered by the shield case 62, and the flexible printed wiring board 71 and circuit board 31 is connected electrically, and the resultant area for electric connection member of the flexible printed wiring board is substantially reduced, as a result, it is easy to obtain the wide flat portion of flexible printed wiring board 71 on the shield case 62 and the flat portion is easy to mount the members and/or devices. In addition, the shield case 62 can be used for preventing the drop of the connection unit 112.

The dead space, which is not used for arrangement of parts, can be reduced compared with the conventional art because the tongue piece 71b is folded back, and it is connected to the camera module 121 electrically. The reasons will be described the followings. In the conventional art, a flexible printed wiring board only used for the camera module, and the connector connecting the flexible printed wiring board to the other board are arranged, and, the space above the flexible printed wiring board and connector is the dead space. In the cellular phone 1 of the present embodiment, the flexible printed wiring board for the camera module is used as the flexible printed wiring board 71 arranged on the other side of the circuit board 31, therefore, the dead space can be reduced. As a result, the light emission part can be arranged at the position adjacent to the camera module 121. In the position of the conventional art, the connector connecting camera module 121 is arranged, and the position has the dead space.

In the present embodiment, the shield case 62 is fixed to the circuit board 32, and is fixed to the first front side case 2c and the first back side case 2d by using the cut away potion 62e into which the boss 2e is fitted, therefore, the structural strength such as the twist strength of the first case 2 is reinforced by the shield case 62. As the above-mentioned, it is not necessary to avoid the overlap between the shield case 62 and the microphone 63, therefore, it is possible to improve the strength of the first case 2 by widening the shield case 62 rather than conventional art. In addition, because the shield case 62 can be positioned by using the boss 2e, the improvement of the work can be achieved.

The wireless communication apparatus of the present invention may be carried out in various modes without being restricted to the above embodiment.

The wireless communication apparatus (electronic apparatus), which can be opened and closed, is not restricted to the one of the fold type, like the above embodiment. The wireless communication apparatus of the present invention may be any one that has at least two cases, can move relatively between a closed state and an opened state. In the closed state, the cases overlap each other. In the opened state, an area, which is a portion or the whole of surfaces facing each other in the closed state, is exposed. Therefore, for example, the wireless communication apparatus may be one apparatus that is opened and closed by parallel movement or rotation movement of a first case and a second case to eliding the cases along each other.

The frame, which touches the back of the first display unit, may be only a member holding the first display unit, and may include the other member which is attached to the member holding the first display unit. In the above embodiment, the main display unit holder 31 and main display unit frame 42 are an example of the frame of the present invention.

The second display unit may touch the frame, and the holder holding the second display unit may touch the frame without the touch of the second display unit on the frame, as long as the second display unit is layered (stacked) on the frame. Moreover, a shape and a size of the portion touching the frame may be any shape and any size. Preferably, the portion touches the frame over a predetermined area, for example, area more than half of the second display unit, like the above the embodiment.

The shield is not restricted to a shape like a case. For example, the shield may be the one like a board without the partition. When the microphone is arranged between the shield and the circuit board, the shape and the size of the shield may be any shape and any size, too. For example, even if the shield is smaller than the conventional art, the freedom of the position where the microphone is arranged can be improved by arranging the microphone between the shield case and the circuit board.

In the above embodiment, the microphone is described as an example of the electricity sound converter, but the electricity sound converter may be any one which converts electric signals to sounds and/or converts sounds to electric signals. For example, if the speaker holder is arranged in the shield case, and a speaker is positioned between the shield case arranged on sound output part's side and. The circuit board arranged on terminal's side, then the effect which is similar to the effect of the above embodiment is achieved.

What is claimed is:

1. An wireless communication apparatus comprising a first case and a second case connected on each end to be able to open and close, wherein the first case is provided with an antenna element in an end opposite to the connected end, the second case is provided with a first display unit displaying an image on a facing surface facing the first case in a closed state, a first drive unit driving the first display unit, a second display unit displaying an image on a back surface which is behind the facing surface, a second drive unit driving the second display unit, a frame provided between the first display unit and the second display unit and touching a back of the first display unit, the frame, the first drive unit and the second drive unit are arranged without overlapping the antenna element in the closed state, a first part of the second display unit is layered on the frame to overlap a second part of the second display unit and the antenna element in the closed state.

2. The wireless communication apparatus according to claim 1, further comprising a holder made of non-electric conductive material and holding the second display unit, wherein;

the holder has a holding part holding the second display unit at the second part and a projected piece projecting to a position not-overlapping the antenna element in the closed state, and the second drive unit is arranged on the projected piece.

3. The wireless communication apparatus according to claim 1, further comprising;

a holder made of non-electric conductive material and holding the second display unit, wherein;

the holder has a holding part holding the second display unit at the second part and a projected piece projecting to the position not-overlapping the antenna element in the closed state;

a pressing switch arranged on the projected piece; and a pressing member arranged on the pressing switch to expose on the back surface and being possible to press the pressing switch when the pressing member is pressed from the back.

4. The wireless communication apparatus according to claim 1, wherein the second display unit has a chamfered end chamfered along an inside of the second case as the second part, and an end of the antenna element is formed as arcuate along an inside of the first case, and surrounds the chamfered end in the closed state.

5. The wireless communication apparatus according to claim 1, further comprising:

a circuit board having a high-frequency circuit;

a shield shielding the high-frequency circuit; and an electricity sound converter having an terminal on one side, and a sound input or output part on the other side, and arranged on a circuit board's surface on which the high-frequency circuit is arranged; wherein the shield has a shield opening of width which is smaller than the electricity sound converter width, and the electricity sound converter is sandwiched between the shield arranged to the terminal side and the circuit board which arranged to the input or output part side, and fixed to the shield opening.

6. The wireless communication apparatus according to claim 5, wherein;

the shield has a wall portion which surrounds the electricity sound converter, and has a boss adjacent to the wall portion, the circuit board and the shield are fixed each other by a screw which is penetrated the circuit board and fits the boss.

7. The wireless communication apparatus according to claim 5, wherein;

the shield has a holder into which the electricity sound converter is fitted, the terminal has a first contact at a center and a second contact at a position away from the center, the circuit board has a third contact at a center of an area facing to the holder and has a fourth contact arranged on the circumference of predetermined radius which centers on the third contact.

8. The wireless communication apparatus according to claim 5, wherein;

a wiring board having a pressing switch is provided on the other side of the shield against the circuit board, and has a board opening at a position corresponding to the shield opening.

9. The wireless communication apparatus according to claim 8, further comprising:

a key sheet which is arranged on the wiring board and has a pressing member facing to the pressing switch and has translucency to the pressing member; and a light emission device arranged between the wiring board and the key sheet, wherein the first case has a upper cover arranged on the wiring board side and a lower cover arranged on the circuit board's side, a key sheet opening is provided in the key sheet at a position facing to the board opening, the upper cover is provided with a upper cover opening which opens above the key sheet opening, and a wall portion having a cylindrical shape, continuing from the edge of the upper cover opening to the inside of the case, and inserted into the key sheet opening.

10. The wireless communication apparatus according to claim 8, further comprising;

a board side connection part which electrically connects the wiring board, and is arranged between the circuit board and the shield, a wiring board side connection part which is provided on a projected piece formed in an end of the wiring board, and connects to the board side connection part by folding back the projected piece.

11. The wireless communication apparatus according to claim 8, further comprising an electronic part controlled through the wiring board, being connected to a projected piece formed in the end of the wiring board, and being arranged on the other side of the circuit board against the high-frequency circuit by folding back the projected piece.

12. The wireless communication apparatus according to claim 5, further comprising:

a wiring board arranged on the other side of the shield against the circuit board;

a plurality of pressing switches arranged on the wiring board;

a plurality of pressing members arranged on the plurality of pressing switches respectively, and having translucency; and a plurality of light emission devices arranged on the wiring board, wherein the pressing switch and the pressing member are arranged in at least two rows, the plurality of light emission devices are arranged at every other space located between the two rows consecutively, a board opening is provided on the wiring board at one of the space where the light emission devices are not arranged, and faces to the shield opening.

13. The wireless communication apparatus according to claim 5, wherein the circuit board and the shield are accommodated in the first case, a power supply terminal is arranged on the other side of the circuit board against the shield, and is arranged on a end of the circuit board, the antenna element is formed in a curved-surface shape expanding so that the antenna element faces a range of a direction that the circuit board's surface having the power supply terminal faces to a direction that is outside of the shield, is arranged the outside of the shield and the inside of the case, and is supplied with power by the power supply terminal.

14. The wireless communication apparatus according to claim 5, wherein the first case or the second case accommodates the circuit board and the shield between an upper cover and a lower cover, a boss fixing the upper cover and the lower cover each other by a screw is arranged in the upper cover or the lower cover, and a cut away portion or a hole, into which the boss fits, is provided in the circuit board and the shield.

* * * * *